US012793441B2

(12) United States Patent
(10) Patent No.: US 12,793,441 B2
(45) Date of Patent: Nov. 10, 2026

Park et al.

(54) METHOD AND DEVICE WITH PARKING SPACE NAVIGATION

(71) Applicant: SAMSUNG ELECTRONICS CO., LTD., Suwon-si (KR)

(72) Inventors: Daeul Park, Suwon-si (KR); Kapje Sung, Suwon-si (KR); Jaewoo Lee, Suwon-si (KR); Younghan Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/818,045

(22) Filed: Aug. 28, 2024

(65) Prior Publication Data

US 2025/0200990 A1 Jun. 19, 2025

(30) Foreign Application Priority Data

Dec. 13, 2023 (KR) ........................ 10-2023-0180878

(51) Int. Cl.

| | |
|---|---|
| ***G06V 20/58*** | (2022.01) |
| ***B60W 30/06*** | (2006.01) |
| ***B60W 60/00*** | (2020.01) |
| ***G06V 10/26*** | (2022.01) |
| ***G06V 10/44*** | (2022.01) |
| *B62D 15/02* | (2006.01) |

(52) U.S. Cl.

CPC ........... *G06V 20/586* (2022.01); *B60W 30/06* (2013.01); *B60W 60/001* (2020.02); *G06V 10/26* (2022.01); *G06V 10/457* (2022.01); *B60W 2420/403* (2013.01); *B60W 2552/53* (2020.02); *B60Y 2300/06* (2013.01); *B62D 15/0285* (2013.01); *G06T 2207/30264* (2013.01)

(58) Field of Classification Search

None

See application file for complete search history.

(56) References Cited

U.S. PATENT DOCUMENTS

| | | | | |
|---|---|---|---|---|
| 8,098,174 B2 * | 1/2012 | Moshchuk | ......... | B62D 15/0285 701/48 |
| 2010/0045448 A1 * | 2/2010 | Kakinami | ............ | G06V 20/586 382/154 |

(Continued)

FOREIGN PATENT DOCUMENTS

| | | |
|---|---|---|
| CN | 116279426 A | 6/2023 |
| KR | 10-1470240 B1 | 12/2014 |

(Continued)

*Primary Examiner* — Peter D Nolan
*Assistant Examiner* — Michael F Whalen
(74) *Attorney, Agent, or Firm* — NSIP Law

(57) ABSTRACT

A method and device with parking space navigation are provided. An operating method of a moving object includes: obtaining, from cameras of the moving object, images of surroundings of the moving object that are captured by the cameras; determining a candidate area for parking the moving object by performing object detection on the images; determining whether the candidate area is occupied by performing scene segmentation on the images; and based on determining that the candidate area is not occupied, determining whether the moving object is able to be parked into the candidate area based on a template area corresponding to a size of the moving object.

20 Claims, 6 Drawing Sheets

(56) References Cited

U.S. PATENT DOCUMENTS

| | | | | |
|---|---|---|---|---|
| 2018/0370566 | A1* | 12/2018 | Kojo | G06V 20/586 |
| 2019/0147243 | A1* | 5/2019 | Ono | G06V 20/52 382/103 |
| 2022/0198928 | A1* | 6/2022 | Liu | G09G 5/37 |

FOREIGN PATENT DOCUMENTS

| | | | |
|---|---|---|---|
| KR | 10-2020-0046159 | A | 5/2020 |
| KR | 10-2022-0080575 | A | 6/2022 |
| WO | WO 2023/032538 | A1 | 3/2023 |

* cited by examiner

METHOD AND DEVICE WITH PARKING SPACE NAVIGATION

CROSS-REFERENCE TO RELATED APPLICATIONS

This application claims the benefit under 35 USC § 119(a) of Korean Patent Application No. 10-2023-0180878, filed on Dec. 13, 2023, in the Korean Intellectual Property Office, the entire disclosure of which is incorporated herein by reference for all purposes.

BACKGROUND

1. Field

The following description relates to a method and device with parking space navigation.

2. Description of Related Art

A parking assist system may recognize a parking space using sensors such as an ultrasonic sensor and a camera sensor and autonomously control movement of a vehicle to park in the parking space. The parking assist system may control the vehicle to park along an optimal movement route by navigating the parking space through sensors equipped in the vehicle, calculating the optimal route along which the vehicle may be parked into the navigated space, and controlling steering of the moving object accordingly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operating method of a moving object includes: obtaining, from cameras of the moving object, images of surroundings of the moving object that are captured by the cameras; determining a candidate area for parking the moving object by performing object detection on the images; determining whether the candidate area is occupied by performing scene segmentation on the images; and based on determining that the candidate area is not occupied, determining whether the moving object is able to be parked into the candidate area based on a template area corresponding to a size of the moving object.

The determining of the candidate area may include: generating bounding boxes of respective objects detected in the images through the object detection; determining, from among the bounding boxes, a bounding box that is nearest to the moving object; and determining the candidate area based on the nearest bounding box.

The determining of whether the candidate area is occupied may include: projecting a result of the scene segmentation to the candidate area.

The determining of the candidate area may include: determining, from among points of the nearest bounding box, that a first point is nearest to the moving object; determining, based on the determined first point, from among the points of the nearest bounding box, a second point and a third point; determining a first straight line to intersect the first point and the second point and determining a second straight line to intersect the third point and to be parallel to the first straight line; and determining the candidate area to include a straight line passing through the first point and the third point, the first straight line, and the second straight line.

The second point may be determined to be a point nearest to the first point among the points of the nearest bounding box in response to a parking direction of the moving object being perpendicular parking, and determined to be a point that is second nearest to the first point among the points of the nearest bounding box in response to the parking direction of the moving object being parallel parking.

The third point may be determined according to whether a parking direction is perpendicular or parallel, and wherein when the parking direction is perpendicular, the third point is determined to be a point that is second nearest to the first point among the points of the nearest bounding box, and when the parking direction is parallel, the third point is determined to be a point nearest to the first point among the points of the nearest bounding box.

The determining of the candidate area may further include: selecting between a parking direction of the moving object being perpendicular or parallel based on an angle a coordinate of the moving object forms with the nearest bounding box or the object thereof.

The selecting the parking direction may include: determining the parking direction to be perpendicular in response to the angle being within a threshold angular distance of plus or minus 90 degrees.

The selecting the parking direction may include: determining the parking direction to be parallel in response to the angle being within a threshold angular distance of 0 degrees 180 or 180 degrees.

The determining of whether the moving object is capable of being parked into the candidate area may include: applying the template area to the candidate area and, in response to the template area being includable in the candidate area, determining that the moving object is able to be parked in the candidate area.

In another general aspect, a moving object includes: cameras; one or more processors; a memory storing instructions configured to cause the processor to: obtain, from the cameras, images of surroundings of the moving object that are captured by the cameras; determine a candidate area for parking the moving object by performing object detection on the images; determine whether the candidate area is occupied by performing scene segmentation on the images; and based on determining that the candidate area is not occupied, determine whether the moving object is able to be parked into the candidate area.

The determining of the candidate area may include: generating bounding boxes of respective objects detected in the images through the object detection; determining, from among the bounding boxes, a nearest bounding box that is nearest to the moving object; and determining the candidate area based on the nearest bounding box.

The instructions may be further configured to cause the one or more processors to: determine whether the candidate area is occupied by projecting a result of the scene segmentation to the candidate area.

The instructions may be further configured to cause the one or more processors to: determine, from among points of the nearest bounding box, that a first point is nearest to the moving object; determine, based on the determined first point, from among the points of the nearest bounding box a second point and a third point; determine a first straight line to intersect the first point and the second point and determine a second straight line to intersect the third point and to be parallel to the first straight line; and determine the candidate area to include a straight line intersecting the first point and the third point, the first straight line, and the second straight line.

The second point may be determined to be a point nearest to the first point among the points of the nearest bounding box in response to a parking direction of the moving object being perpendicular parking, and determined to be a point that is second nearest to the first point among the points of the nearest bounding box in response to the parking direction of the moving object being parallel parking.

The third point may be determined according to whether a parking direction is perpendicular or parallel, and wherein when the parking direction is perpendicular, the third point is determined to be a point that is second nearest to the first point among the points of the nearest bounding box, and when the parking direction is parallel, the third point is determined to be a point nearest to the first point among the points of the nearest bounding box.

The instructions may be further configured to cause the one or more processors to: select, for a parking direction, between parallel parking and perpendicular parking based on an angle between the nearest bounding box and a coordinate of the moving object; and determine the candidate area based on the selected parking direction.

In another general aspect, a method is performed by a computing device of a vehicle controlled by the computing device, and the method includes: capturing images by cameras of the vehicle; performing object detection on the images to generate bounding boxes of vehicles near the vehicle; selecting, as a nearest bounding box, one of the bounding boxes determined to be nearest to the vehicle; determining a candidate parking area by extending the nearest bounding box in a first direction of the bounding box or in a second direction of the bounding box; based on the images, determining that the candidate parking area is not occupied; based on the images, determining that the vehicle is able to be parked into the parking area; and based on the determining that the candidate parking area is not occupied and that the vehicle is able to be parked into the parking area, autonomously parking the vehicle into the candidate area.

The method may further include determining whether to extend the nearest bounding box in the first direction or in the second direction based on an angle determined according to a coordinate system of the vehicle and the nearest bounding box.

The determining that the candidate area is able to be parked in by the vehicle may be based on a size of the vehicle and the candidate area.

Other features and aspects will be apparent from the following detailed description, the drawings, and the claims.

Figure 1:
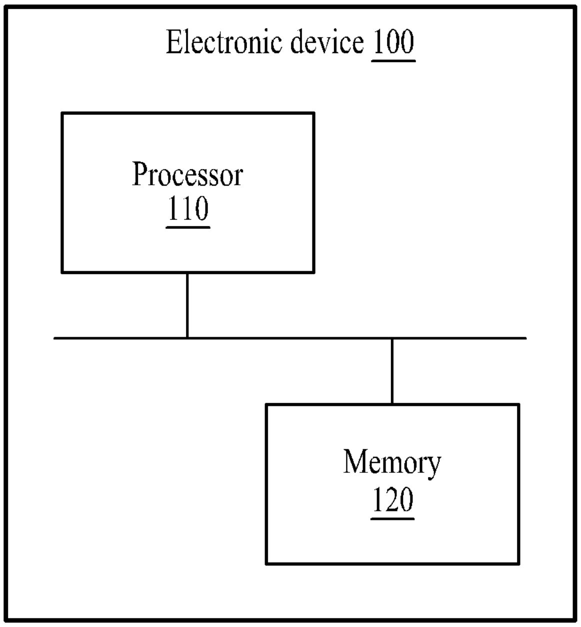
FIG. 1 illustrates an example of an electronic device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of an electronic device, according to one or more embodiments.

Referring to FIG. 1, an electronic device 100 may include a processor 110 and a memory 120. The processor 110 and the memory 120 may communicate with each other through a bus, a network on a chip (NoC), peripheral component interconnect express (PCIe), or the like. The electronic device 100 herein may be included in and control a moving object, for example a vehicle, although the electronic device 100 may be separate from the moving object. The electronic device 100 may perceive surroundings of the moving object using one or more sensors such as a camera, light detection and ranging (LiDAR), a radar, etc. The moving object may be, for example, a vehicle, a mobile robot, a drone, etc.

The processor 110 may perform overall functions for controlling the electronic device 100. The processor 110 may control the electronic device 100 overall by executing programs and/or instructions stored in the memory 120. The processor 110 may be implemented as a central processing unit (CPU), a graphics processing unit (GPU), an application processor (AP), and the like that are included in the electronic device 100. However, examples are not limited thereto. For example, the processor 110 may cause the electronic device 100 to perform operations shown in FIGS. 2 to 6 by executing the programs and/or instructions stored in the memory 120.

The memory 120 may store data that is to be processed or that is processed in the electronic device 100. In addition, the memory 120 may store an application, a driver, an operating system, and the like to be executed by the electronic device 100. In addition, the memory 120 may store instructions and/or programs that may be executed by the processor 110. The memory 120 may include a volatile memory (e.g., dynamic random-access memory (DRAM)) and/or a non-volatile memory. The electronic device 100 may also include other general-purpose components in addition to the components illustrated in FIG. 1. For example, the electronic device 100 may further include devices such as a camera, a LiDAR sensor, an input device, an output device, and a network device.

By way of comparison, a parking assist system may detect a parking space using an ultrasonic sensor, for example. Alternatively, a parking assist system may also detect a parking space using a bird-eye-view (BEV) image obtained through synthesis (to BEV form) of data from built-in cameras of a vehicle. With this approach, when a parking line demarking a parking space is aging and difficult to identify in the image, the performance of the parking assist system may deteriorate. In some situations, there might be no parking lines and autonomous parking is not possible. In addition, in the case that the parking assist system uses a trained spatial recognition model (e.g., a neural network), when a parking lot including a parking space that is not used in training a spatial recognition model is input to the spatial recognition model, the performance of the parking assist system may deteriorate. In addition, when detecting a parking space based on an ultrasonic sensor, since only distance information recognized using ultrasonic waves is used, and since an image obtained through a camera is not used, there may be a case in which actual parking is not possible. Therefore, methods of navigating a parking space of a moving object using object detection and scene segmentation are described herein.

Figure 2:
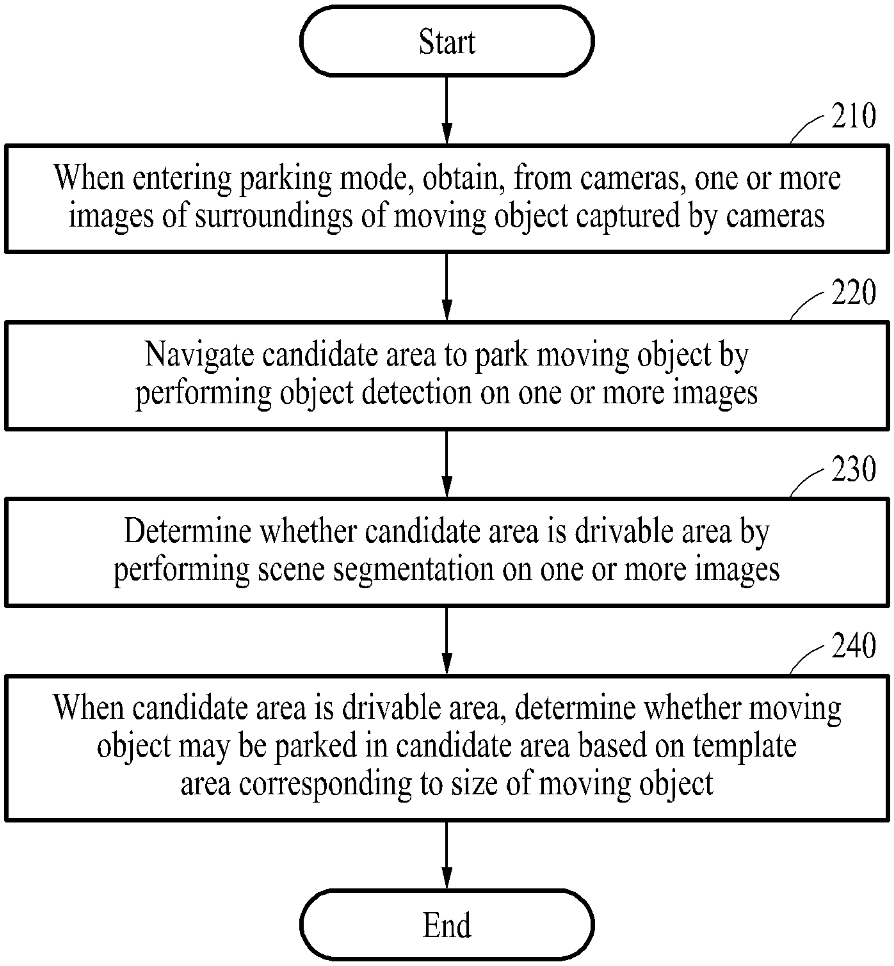
FIG. 2 illustrates a method of a controlling movement of a vehicle, according to one or more embodiments.

FIG. 2 illustrates an example method of controlling a moving object, according to one or more embodiments. The method may be performed by the electronic device 100. Because the electronic device 100 may be part of (mounted in) the moving object, the method (and other operations) is at times described as being performed by the moving object, which generally refers to operations of the electronic device 100.

The method may be initiated when the moving object enters the parking mode, which may be entered manually in response to a driver's input, for example. Although examples and embodiments are described as using a parking mode, an explicit parking mode is not required; the method may be initiated in other ways, for example in the course of autonomously driving.

In operation 210, the moving object may, when the parking mode is entered/activated, obtain images of surroundings of the moving object that are captured by cameras of the moving object. For example, the moving object may have cameras facing in different directions relative to the moving object, for example, frontwards, sideways, and rearward. The cameras may capture images in directions of the front, back, left, and right of the moving object, for example, thus obtaining a front image, a back image, a left image, and a right image relative to the moving object (fewer images, even one, may be captured). When it enters the parking mode, the moving object may also obtain a point cloud, for example from a sensor (e.g., a LiDAR sensor, a radar), from pre-stored or pre-captured data, etc. The captured images and the point cloud may be used by the moving object to navigate itself into the parking space.

In operation 220, to facilitate the moving object navigating itself into a candidate area to park, the moving object may perform object detection on the captured images. Object detection is further described with reference to FIG. 3.

In operation 230, the moving object may determine whether the candidate area is a drivable area (e.g., whether the candidate area is occupied) by performing scene segmentation on the captured images. Scene segmentation performed by the moving object is further described with reference to FIG. 3.

In operation 240, when the candidate area is determined to be a drivable/unoccupied area, the moving object may determine whether it is able to park into the candidate area based on a template area corresponding to the size of the moving object (e.g., whether the moving object can fit into the candidate area).

A method of determining whether the moving object is able to park in the candidate area is further described with reference to FIGS. 4 and 5.

Object detection and scene segmentation performed by the moving object are described next.

Figure 3:
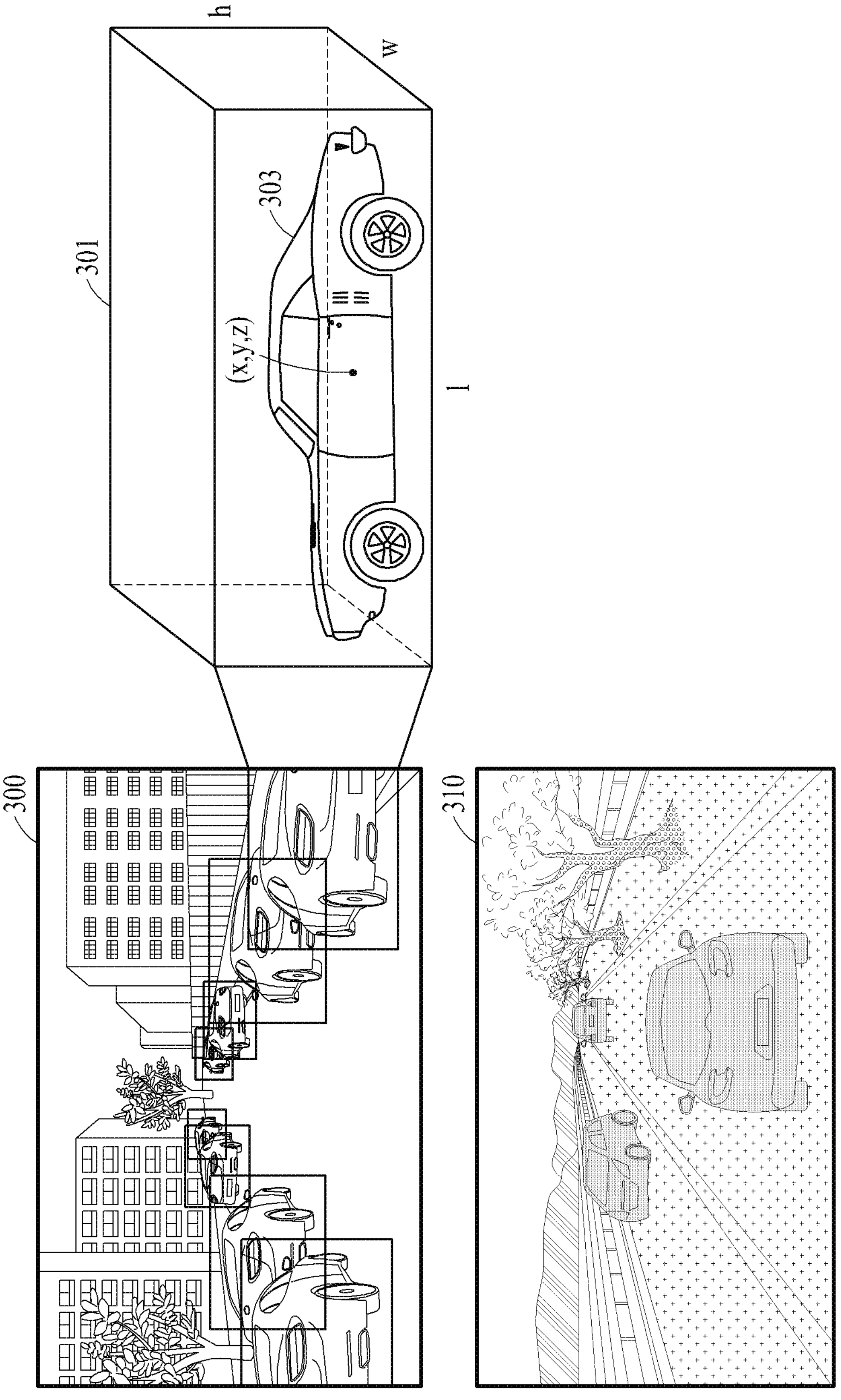
FIG. 3 illustrates an example of object detection and scene segmentation, according to one or more embodiments.

FIG. 3 illustrates an example of object detection and scene segmentation, according to one or more embodiments. The method of FIG. 3 may involve scene reconstruction where a moving object has its own frame of reference and the moving object detects and/or identifies nearby objects and their poses (locations and orientations) in the moving object's frame of reference.

Referring to FIG. 3, an object detection image 300, in which a moving object performed object detection on images obtained from a camera, is shown. A scene segmentation image 310, in which the moving object performed scene segmentation on the images obtained from the camera, is also shown.

As described above, when entering a parking mode, the moving object may obtain images from its cameras included in the moving object and may also obtain point cloud data. The images and/or point cloud may be inputted to an object detection model configured and trained for three-dimensional (3D) object detection. The object detection model may be a model trained based on deep learning (i.e., machine learning) and may include, for example, a convolutional neural network or other architecture suitable for 3D object detection. Different implementations/architectures of the object detection model may be used for different kinds of inputs. For example, an object detection model may be configured to receive multiple images and information about their cameras (e.g., direction/location). An object detection model may be configured to receive point cloud data as input. An object detection model may be configured for multi-modal input and may receive image(s) and point cloud data as inputs. Regardless of the details of the object detection model, as described next, the model may infer 3D object information based on the image(s) and/or the point cloud data obtained by the moving object. The moving object may obtain information on objects included in an image through the object detection model. The object information may include object representations of the respective objects. Each object representation may include information about its corresponding object, for example, a 3D bounding box, a location and orientation (pose), and an identified class or category. Regarding the 3D bounding boxes, the moving object may generate a 3D bounding box for each of the objects it detects through the object detection model. Referring to the object detection image 300, boxes may be generated for other (external) moving objects among the objects included in the image.

Described next is an example of one 3D bounding box that is representative of any of the 3D bounding boxes in the object detection image 300. Although 3D bounding boxes are a common and convenient way of representing the area/volume of 3D objects, other volume representations may be used, for example inferred mesh models, 3D models substituted-in from a database based on the detected classes of objects, etc.

A box 301 may correspond to an external moving object 303. An object representation of the external moving object may include the box 301. The moving object may obtain a pose and shape (dimensions) of the box 301 through its object detection model. The pose of the box 301 may include a location point (x, y, z) of the box 301. The location point (x, y, z) of the box 301 may be, for example, a center point (e.g., center of mass) of the external moving object in the coordinate system (frame of reference) of the moving object.

The shape of the box 301 may include a width (w), length (l), and height (h) of the box 301.

The object representation of the box 301 may include a direction (θ) that the box 301 is facing (i.e., its orientation). θ may indicate the direction the box 301 is facing relative to the direction that the moving object is facing in the moving object's coordinate system. The direction that the box 301 is facing may correspond to the direction that the front of an object included in box 301 is facing. For convenience, the box 301 will be considered to include the box's dimensions and pose (location and direction).

The method of navigating the candidate area to park the moving object using the detected box 301 is described with reference to FIGS. 4 and 5.

In addition to performing object detection/identification, the moving object may perform scene segmentation using a scene segmentation model with the obtained images as an input. The scene segmentation model may be a model trained based on deep learning (i.e., machine learning). In some implementations, the scene segmentation model is configured to also use point cloud data as input that contributes to its image scene segmentation.

The moving object may classify the objects or regions included in an image (e.g., one of the captured images or a synthetic image) using the scene segmentation model. For example, referring to the scene segmentation image 310, which is an output of the scene segmentation model, each pixel included in the scene segmentation image 310 may be classified into a class, such as a moving object class, a road class, or a building class. The moving object may determine whether the candidate area is a drivable area, that is, whether the moving object may able to drive in the candidate area, and may do so using the scene segmentation image 310. The drivable area may include not only a paved road/surface but also an unpaved road/surface such as gravel and lawns. Thus, the scene segmentation model may be a model (e.g. a neural network) trained to classify a road/surface area as being either a drivable area or a non-drivable area.

An operation of determining whether the candidate area is a drivable area using the scene segmentation image 310 is further described with reference to FIGS. 4 and 5.

Figure 4:
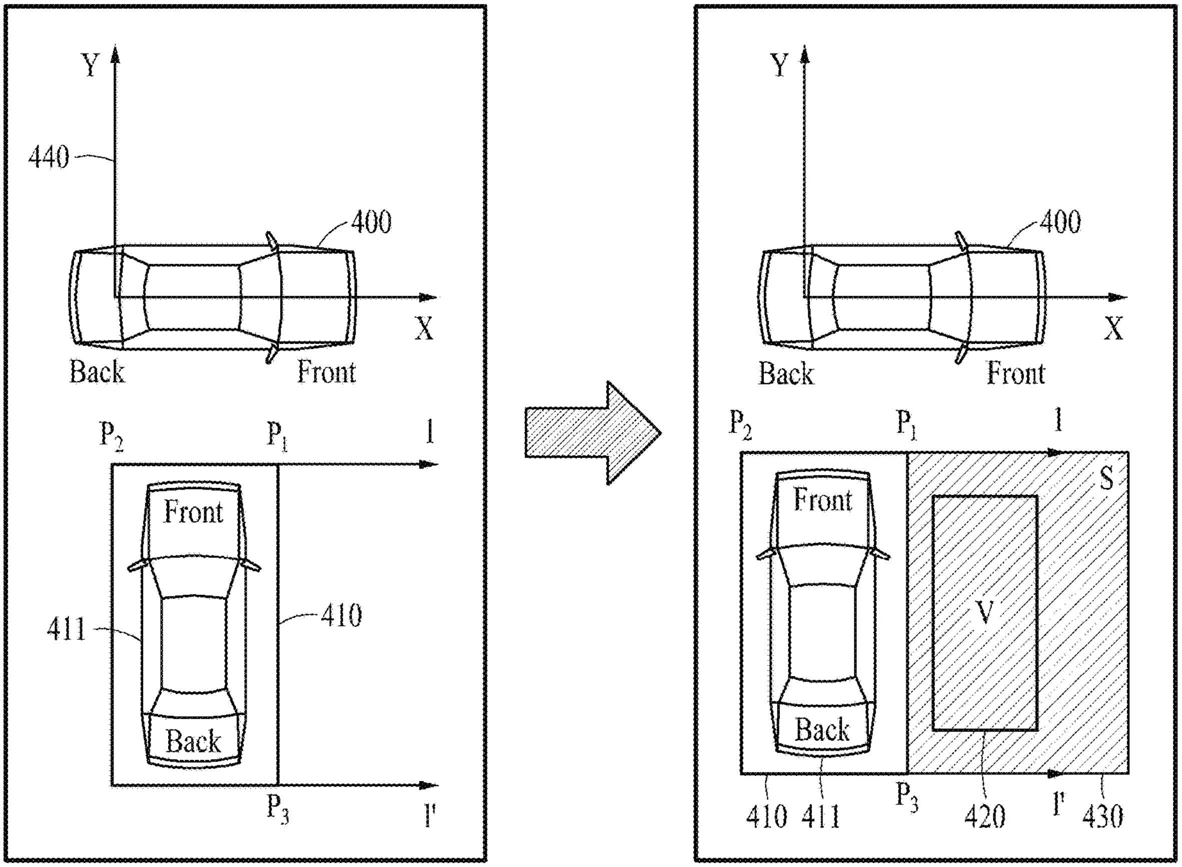
FIG. 4 illustrates an example of navigating a parking space when perpendicular parking, according to one or more embodiments.

FIG. 4 illustrates an example of a method of navigating a parking space when perpendicular parking, according to one or more embodiments.

FIG. 4, shows a top-view diagram of perpendicular parking of a moving object 400. Box 410, described below, may correspond to a 3D box such as box 301. However, a 2D box may be sufficient for the perpendicular parking method. For example, the bottom four corners of a 3D box may suffice as box 410. The moving object 400 may not initially know whether perpendicular or parallel parking is to be performed, however, a technique for determining that perpendicular parking is to be performed is described below. Generally, as described next, points, lines and angles related to the moving object 400 and the box 410 may be used to (i) determine that perpendicular parking is to be performed, and (ii) navigate the perpendicular parking.

Prior to navigating into a parking space, the moving object 400 may generate a template 420 (e.g., V of FIG. 4) representing a minimal area needed for parking the moving object 400. The dimensions of the template 420, that is, the minimal area for perpendicular parking, may be set according to the size dimensions of the moving object 400, or, a preset template may be used.

When entering parking mode, the moving object 400 may obtain, from its cameras, images of surroundings of the moving object 400 that are captured by the moving object's 400 cameras. The moving object 400 may also obtain a point cloud of its surroundings. The moving object 400 may perform object detection on the images and/or the point cloud, as described above. Thus, through the object detection, as described above, boxes of respectively corresponding nearby moving objects may be generated.

The moving object 400 may determine a nearest object 411 (or box) to the moving object 400 on the basis of a coordinate system 440 (frame of reference) of the moving object. The moving object's coordinate system 440 may be arranged/defined according to the rear axle of the moving object 400. For example, the moving object coordinate system 440 may be defined to have its origin at the center of the rear axle, and to have its x-axis aligned with the front-facing direction of the moving object 400 (i.e., along the middle of the length of the moving object 400). The y-axis of the moving object coordinate system 440 may be defined to intersect the origin and be perpendicular to the x-axis (or may be defined to correspond to the rear axle). A z-axis may be omitted because a two-dimensional coordinate system (a top-view) may be sufficient, however, a z-axis may be included and be perpendicular to the x-axis and y-axis.

The nearest object 411 to the moving object 400 may be defined as the object that is nearest to the origin of the moving object coordinate system 440. Determining which object (box) is among the detected boxes/objects nearest to the origin of the moving object coordinate system 440 (which is the nearest object 411) may be performed in a variety of ways. For example, among boxes adjacent to the moving object 400 (or within a threshold distance), the object having the least distance from the origin of the moving object coordinate system 440 to the center of the box 410 may be determined to be the nearest object 411 to the origin of the moving object coordinate system 440.

The moving object 400 may determine/generate a candidate area 430 (shaded S of FIG. 4) based on the box 410 of the nearest object 411 to the moving object 400. Specifically, the box 410 may have four lower points (the bottom corners of the box), and the moving object 400 may determine which of the points (e.g., lowest) of the box 410 is nearest to the moving object 400. In the example of FIG. 4, the point nearest to the origin of the moving object coordinate system 440 is determined to be the first point $P_1$.

The moving object 400 may also determine a second-nearest point and third-nearest point among the points of the box 410. In the example of FIG. 4, the moving object 400 determines a second point $P_2$ and a third point $P_3$ to be the second-nearest and third-nearest lower points, respectively, of the box 410. In determining the second-nearest and third-nearest points, an explicit determination based on determined distances might not be needed, as in some cases the geometry and location of the box 410 may imply which points are second and third closest to the moving object 400.

As in the example of FIG. 4, when perpendicular parking, the distance between the first point $P_1$ and the second point $P_2$ may be w (mentioned earlier). Similarly, the distance between the first point $P_1$ and the third point $P_3$ may be l. With the points and distances determined in the moving object coordinate system 440 (or any frame reference of the moving object 400), a method of navigating perpendicular parking may be performed, as described next.

The moving object 400 may determine a first straight line passing through the first point $P_1$ and the second point $P_2$. The moving object 400 may determine a second straight line passing through the third point $P_3$ and parallel to the first straight line.

The moving object 400 may determine the candidate area 430 (e.g., shaded area S in FIG. 4) including a straight line passing through the first point $P_1$ and the third point $P_3$, the first straight line, and the second straight line.

The moving object 400 may determine the parking direction of the moving object 400 (whether perpendicular or parallel) based on an angle the moving object 400 forms with the nearest object 411 (or the box 410). Although the angle is discussed with reference to the moving object, in this context, "moving object" refers to data representing the moving object, e.g., a location or point of the moving object, an origin of a coordinate system, etc. As described next, this may involve determining if the moving object 400 and the object 411 (or box 410) are sufficiently close to perpendicular to each other. For example, the angle formed may be an angle between the heading (facing direction) of the moving object 400 and the heading (facing direction). Or, for example, the angle formed may be between the x-axis of the moving object coordinate system 440 and the direction of a lengthwise side of the box 410. Specifically, the moving object 400 may determine the parking direction to be perpendicular parking when the formed angle is within a threshold angular distance of 90 degrees (or −90 degrees). For example, when the threshold angular distance is 10 degrees, if the angled formed is between 80 and 100 degrees (or within −80 to −100 degrees), it is within the threshold angular distance. When the angle the moving object 400 forms with the nearest object 411 is 85 degrees (or −85 degrees), the parking direction may be determined to be perpendicular parking. In the example of FIG. 4, the moving object 400 and the box 410 form a 90-degree angle and thus the parking direction is determined to be perpendicular parking.

The moving object 400 may determine whether the candidate area 430 is a drivable area (e.g., not occupied by another vehicle or object) through scene segmentation. Specifically, the moving object 400 may determine whether a class of the candidate area 430 is "drivable area" by projecting a result of the scene segmentation to the candidate area 430. In other words, the moving object 400 may project the result of the scene segmentation of image(s) that include the candidate area 430 to a model of the real world. To that end, a camera parameter may be used in projecting the result of the scene segmentation of the image including the candidate area 430 to the model of the real world. The moving object 400 may project the result of the scene segmentation of the image(s) that include the candidate area 430 to the model of the real world using the camera parameter. The moving object 400 may convert the result of the scene segmentation of the image including the candidate area 430 to a camera coordinate system using an intrinsic camera parameter and may convert the result of the scene segmentation (as converted to the camera coordinate system) to the model of the real world using an extrinsic camera parameter.

As described above, the moving object 400 may determine whether the candidate area 430 is a drivable area by projecting the result of the scene segmentation. However, even when the candidate area 430 is determined to be a drivable area by projecting the result of the scene segmentation, when an obstacle (e.g., a traffic cone) is present in the candidate area 430, the moving object 400 may accordingly determine that the candidate area 430 is not drivable (may not be parked).

When the candidate area 430 is determined to be a drivable area, the moving object 400 may determine whether the moving object 400 may be in the candidate area 430 based on the template 420. Specifically, the moving object 400 may determine whether the template 420 fits within the candidate area 430. This may involve the moving object 400, for example, applying a sliding window method to the drivable area and the template 420.

When searching an area in which the moving object 400 may be parked, and when an area is determined to be drivable and parkable, the moving object 400 may ask a driver whether to park in that specific area. When receiving a command from the driver to park in the area, the moving object 400 may autonomously park itself into the area without separate control by the driver. For example, the moving object 400 may navigate a parking route, targeting the area in which the moving object 400 is to be parked. The moving object 400 may navigate the parking route using algorithms such as sampling-based approach, grid-based approach, and optimization-based approach. As a control system of the moving object 400 may be controlled based on the navigated parking route, steering, acceleration, and deceleration of the moving object 400 may be controlled. The control system may include controllers that control the steering, the acceleration, and the deceleration based on the parking route. For example, the control system may implement the pure pursuit controller, the Kanayama controller, the Stanley controller, a sliding window approach, a model predictive controller, or the like.

When receiving a command from the driver not to park in the area in which the moving object 400 may be parked, the moving object 400 may perform navigating for another area to be parked in.

Even when the moving object 400 has found an area in which the moving object 400 may be parked, the area may be an area in which the moving object 400 is not allowed to park, such as a driveway of a building or a crosswalk. The moving object 400 may further determine whether an area in which the moving object 400 is to be parked (or is evaluating for parking) is an area in which the moving object 400 is not allowed to park, such as a driveway of a building or a crosswalk, using a global positioning system (GPS) and/or a navigation system. When the area is determined to be an area in which the moving object 400 is not allowed to park, the moving object 400 may perform navigating for another area to be parked in.

The above examples may also be applied to parallel parking, described next.

Figure 5:
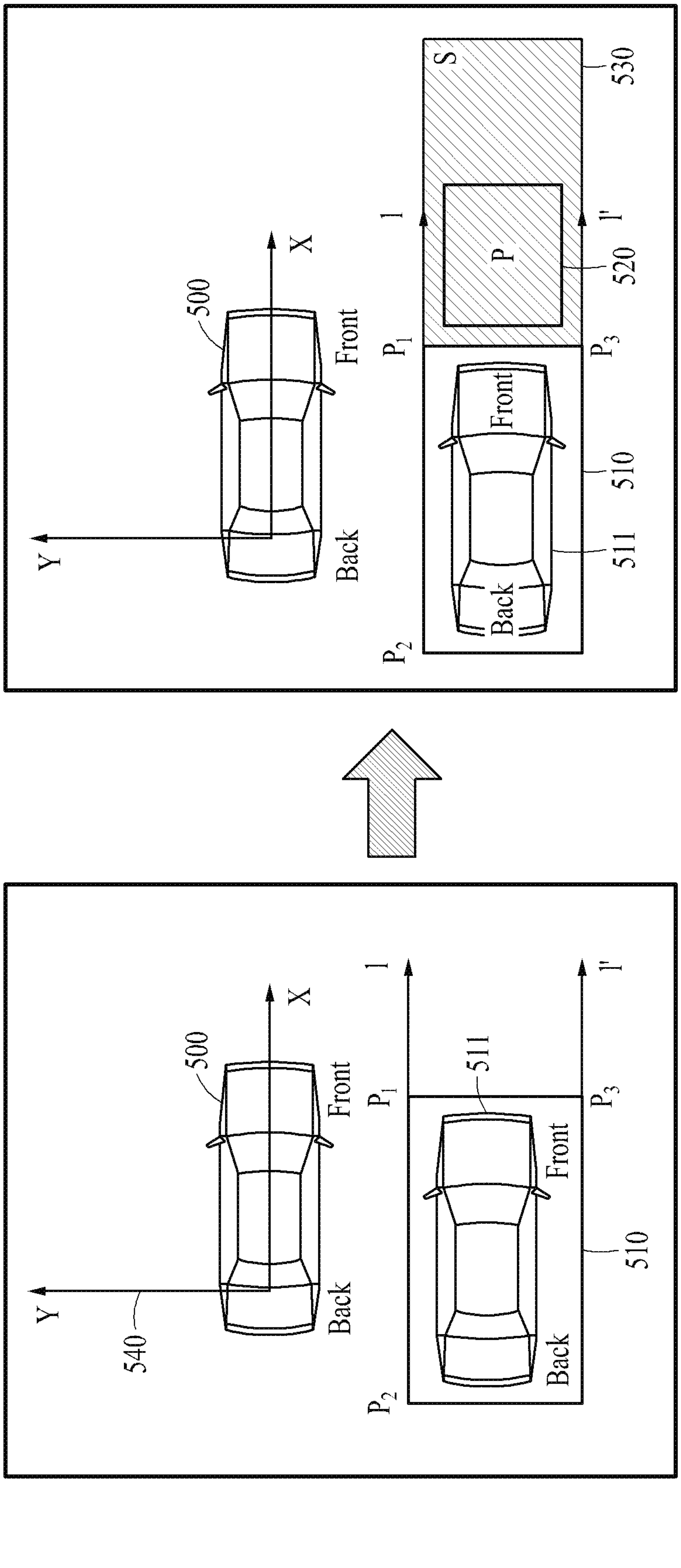
FIG. 5 illustrates an example of navigating a parking space when parallel parking, according to one or more embodiments.

FIG. 5 illustrates an example of a method of navigating a parking space when parallel parking, according to one or more embodiments.

Referring to FIG. 5, for ease of description, a diagram of perpendicular parking of the moving object from a top view is shown. However, in practice the information of FIG. 5 may be in three dimensions.

Prior to navigating a parking space, the moving object 500 may generate/obtain a template 520 (e.g., P of FIG. 5) having a minimum area for parking corresponding to the size of the moving object 500.

When entering a parking mode, the moving object 500 may obtain, from moving object's cameras, images of surroundings of the moving object 500 that are captured by the cameras. The moving object 500 may also obtain a point cloud of the surroundings. As described above, the moving object 500 may perform object detection on the images and/or the point cloud. Through the object detection, boxes may be generated for other moving objects located around the moving object 500. In some implementations, the moving objects may be identified as such and therefore may be their boxes may be specifically selected for determining a parking area.

The moving object 500 may determine a nearest object 511 (or box 510) to the moving object 500 on the basis of a moving object coordinate system 540 that is based on a rear axle of the moving object 500. The description of FIG. 4 is generally applicable to the nearest object/box and the moving object coordinate system.

The moving object 500 may determine a candidate area 530 based on the box 510 of the nearest object 511. Briefly, the moving object 500 may determine, for the nearest object/box, a first point that is nearest to the moving object 500, a third point that is nearest to the first point, and a second point that is second-nearest to the first point.

Specifically, the moving object 500 may determine, from among points that are present in a lower portion of the box 510 (e.g., bottom corners), the point nearest to the moving object 500. In the example of FIG. 5, the point nearest to the origin of the moving object coordinate system 540 is determined to be the first point $P_1$. The moving object 500 may determine a second point $P_2$ and a third point $P_3$ from among the points present in the lower end portion of the box 510 except for the first point $P_1$.

Here, when the parking direction of the moving object 500 is parallel parking, a point that is nearest to the point nearest to the moving object 500 (e.g., first point $P_1$) among the other points in the lower end portion (bottom) of the box 510 may be determined to be the third point $P_3$. Furthermore, in parallel parking, the distance between the first point $P_1$ and the third point $P_3$ may be w (e.g., the width of the box 510).

A point that is second-nearest to the first point $P_1$ among the points in the lower end portion (bottom) of the box 510 may be determined to be the second point $P_2$. Thus, in parallel parking, a distance between the first point $P_1$ and the second point $P_2$ may be l (the length of the box 510). A method of determining parallel parking is described next.

The moving object 500 may determine a first straight line passing through the first point $P_1$ and the second point $P_2$. The moving object 500 may determine a second straight line passing through the third point $P_3$ and parallel to the first straight line.

The moving object 500 may determine the candidate area 530 (e.g., S of FIG. 5) including a straight line passing through the first point $P_1$ and the third point $P_3$, the first straight line, and the second straight line.

With the foregoing having been determined, the moving object 500 may determine the parking direction of the moving object 500 based on an angle the moving object 500 forms with the nearest object 511 (or the box 510).

Specifically, the moving object 500 may determine the parking direction to be parallel parking when the angle the moving object 500 forms with the nearest object 511 is within a threshold angular distance of 0 (or 180) degrees. For example, when the threshold angular distance is 10 degrees, the parking direction may be determined to be parallel when the angle is between 10 and −10 degrees (or 170 to 190 degrees). For example, when the angle the moving object 500 forms with the nearest object 511 is 5 degrees, the parking direction may be determined to be parallel parking. Referring to the example of FIG. 5, the moving object 500 and the box 510 form a 0-degree angle and thus the parking direction may be determined to be parallel parking.

The moving object 500 may determine whether the candidate area 530 is a drivable (occupiable) area through scene segmentation. To this end, the technique described above with reference to FIG. 4 may be used.

The moving object 500 may determine whether the candidate area 530 is a drivable area by projecting the result of the scene segmentation. However, even when the candidate area 530 is determined to be a drivable area, when an obstacle (e.g., a traffic cone) is present in the candidate area 530, the moving object 500 may determine the candidate area 530 to be an area in which the moving object 500 may not be parked.

When the candidate area 530 is determined to be a drivable area, the moving object 500 may determine whether the moving object 500 may be parked in the candidate area 530 based on a template 520. The moving object 500 may determine the candidate area 530 to be an area in which the moving object 500 may be parked when the template 520 is parkable (e.g., fits, can be maneuvered, etc.) in the candidate area 530. Known techniques for this determination may be used, for example, the sliding window technique.

In addition to the aforementioned potential advantages, techniques described herein may be used by a fleet of autonomous moving objects, e.g., vehicles, to systematically park in an organized manner. For example, a first vehicle may be parked, a second vehicle may park itself next to (or ahead/behind) the first vehicle, a third vehicle may park itself according to where the second vehicle is parked, and so forth.

Figure 6:
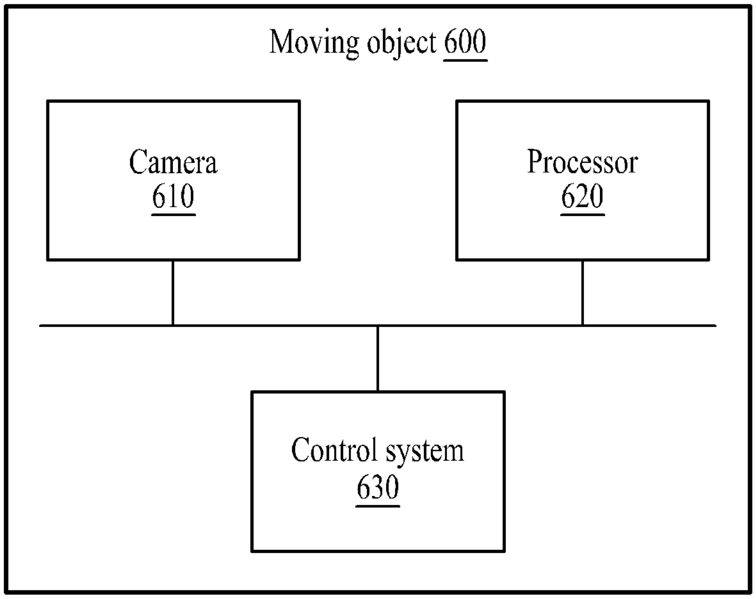
FIG. 6 illustrates an example configuration of a moving object, according to one or more embodiments.

FIG. 6 illustrates an example configuration of a moving object, according to one or more embodiments.

Referring to FIG. 6, a moving object 600 may include a camera 610, a processor 620, and a control system 630. The moving object 600 may further include other devices such as a storage device, a memory, an input device, an output device, a network device, and a drive system, for example.

The camera 610 may take pictures of surroundings of the moving object 600 when the moving object 600 enters a parking mode. The processor 620 may execute instructions for performing the operations described above with reference to FIGS. 1 to 5. For example, the processor 620 may execute instructions to cause the moving object 600 to, when the moving object 600 enters a parking mode, obtain, from cameras, one or more images of the surroundings of the moving object 600 that are captured by the cameras. In addition, the processor 620 may execute instructions to cause the moving object 600 to navigate a candidate area to park the moving object 600 by performing object detection on one or more images. In addition, the processor 620 may execute instructions to cause the moving object 600 to determine if the candidate area is a drivable area by performing scene segmentation on one or more images. When the candidate area is a drivable area, the processor 620 may execute instructions to cause the moving object 600 to determine whether the moving object 600 may be parked in the candidate area.

The control system 630 may control steering, acceleration, and deceleration of the moving object 600 without requiring control by a driver so that the moving object 600 may autonomously park itself into an area into a parkable area. In other words, the control system 630 may control the moving object 600 and/or the drive system.

The moving object 600 may perform navigation of a parking space even when a parking line is blurred or not present (e.g., when vehicles park in a field). Since the moving object 600 does not require use of a trained spatial recognition model, the moving object 600 may navigate a parking space in parking lots of various environments.

The computing apparatuses, the vehicles, the electronic devices, the processors, the memories, the image sensors, the vehicle/operation function hardware, the driving control systems, the displays, the information output system and hardware, the storage devices, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD−Rs, CD+Rs, CD−RWs, CD+RWs, DVD-ROMs, DVD−Rs, DVD+Rs, DVD−RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An operating method of a moving object, the operating method comprising:

obtaining, from cameras of the moving object, images of surroundings of the moving object that are captured by the cameras;

performing object detection on the images, the object detection comprising generating bounding boxes of respective objects detected by the object detection;

selecting one of the bounding boxes and forming a candidate area by extending two opposing sides of the selected bounding box, the extended portions of the opposing sides defining two sides of the candidate area;

determining whether the candidate area is occupied by performing scene segmentation on the images; and based on determining that the candidate area is not occupied, determining whether the moving object is able to be parked into the candidate area based on the candidate area and based on a template area corresponding to a size of the moving object, the template area comprising a polygon; and autonomously parking the moving object into the candidate area based on determining that the candidate area is not occupied and that the moving object is able to be parked into the candidate area.

2. The operating method of claim 1, wherein the determining of the candidate area comprises:

generating bounding boxes of respective objects detected in the images through the object detection;

determining, from among the bounding boxes, a bounding box that is nearest to the moving object; and determining the candidate area based on the nearest bounding box.

3. The operating method of claim 1, wherein the determining of whether the candidate area is occupied comprises:

projecting a result of the scene segmentation to the candidate area.

4. The operating method of claim 2, wherein the determining of the candidate area comprises:

determining, from among points of the nearest bounding box, that a first point is nearest to the moving object;

determining, based on the determined first point, from among the points of the nearest bounding box, a second point and a third point;

determining a first straight line to intersect the first point and the second point and determining a second straight line to intersect the third point and to be parallel to the first straight line; and determining the candidate area to comprise a straight line passing through the first point and the third point, the first straight line, and the second straight line.

5. The operating method of claim 4, wherein the second point is determined to be a point nearest to the first point among the points of the nearest bounding box in response to a parking direction of the moving object being perpendicular parking, and determined to be a point that is second nearest to the first point among the points of the nearest bounding box in response to the parking direction of the moving object being parallel parking.

6. The operating method of claim 4, wherein the third point is determined according to whether a parking direction is perpendicular or parallel, and wherein when the parking direction is perpendicular, the third point is determined to be a point that is second nearest to the first point among the points of the nearest bounding box, and when the parking direction is parallel, the third point is determined to be a point nearest to the first point among the points of the nearest bounding box.

7. The operating method of claim 2, wherein the determining of the candidate area further comprises:

selecting between a parking direction of the moving object being perpendicular or parallel based on an angle a coordinate of the moving object forms with the nearest bounding box or the object thereof.

8. The operating method of claim 7, wherein the selecting the parking direction comprises:

determining the parking direction to be perpendicular in response to the angle being within a threshold angular distance of plus or minus 90 degrees.

9. The operating method of claim 7, wherein the selecting the parking direction comprises:

determining the parking direction to be parallel in response to the angle being within a threshold angular distance of 0 degrees 180 or 180 degrees.

10. The operating method of claim 1, wherein the determining of whether the moving object is capable of being parked into the candidate area comprises:

applying the template area to the candidate area and, in response to the template area being includable in the candidate area, determining that the moving object is able to be parked in the candidate area.

11. A moving object comprising:

cameras;

one or more processors;

a memory storing instructions configured to cause the processor to:

obtain, from the cameras, images of surroundings of the moving object that are captured by the cameras;

perform object detection on the images, the object detection comprising generating bounding boxes of respective objects detected by the object detection;

select one of the bounding boxes and form a candidate area by extending two opposing sides of the selected bounding box, the extended portions of the opposing sides defining two sides of the candidate area;

determine whether the candidate area is occupied by performing scene segmentation on the images;

based on determining that the candidate area is not occupied, determine whether the moving object is able to be parked into the candidate area based on the candidate area and based on a template area corresponding to a size of the moving object, the template area comprising a polygon; and autonomously park the moving object into the candidate area based on determining that the candidate area is not occupied and that the moving object is able to be parked into the candidate area.

12. The moving object of claim 11, wherein the determining of the candidate area comprises:

generating bounding boxes of respective objects detected in the images through the object detection;

determining, from among the bounding boxes, a nearest bounding box that is nearest to the moving object; and determining the candidate area based on the nearest bounding box.

13. The moving object of claim 11, wherein the instructions are further configured to cause the one or more processors to:

determine whether the candidate area is occupied by projecting a result of the scene segmentation to the candidate area.

14. The moving object of claim 12, wherein the instructions are further configured to cause the one or more processors to:

determine, from among points of the nearest bounding box, that a first point is nearest to the moving object;

determine, based on the determined first point, from among the points of the nearest bounding box a second point and a third point;

determine a first straight line to intersect the first point and the second point and determine a second straight line to intersect the third point and to be parallel to the first straight line; and determine the candidate area to comprise a straight line intersecting the first point and the third point, the first straight line, and the second straight line.

15. The moving object of claim 14, wherein the second point is determined to be a point nearest to the first point among the points of the nearest bounding box in response to a parking direction of the moving object being perpendicular parking, and determined to be a point that is second nearest to the first point among the points of the nearest bounding box in response to the parking direction of the moving object being parallel parking.

16. The moving object of claim 14, wherein the third point is determined according to whether a parking direction is perpendicular or parallel, and wherein when the parking direction is perpendicular, the third point is determined to be a point that is second nearest to the first point among the points of the nearest bounding box, and when the parking direction is parallel, the third point is determined to be a point nearest to the first point among the points of the nearest bounding box.

17. The moving object of claim 12, wherein the instructions are further configured to cause the one or more processors to:

select, for a parking direction, between parallel parking and perpendicular parking based on an angle between the nearest bounding box and a coordinate of the moving object; and determine the candidate area based on the selected parking direction.

18. A method performed by a computing device of a vehicle controlled by the computing device, the method comprising:

capturing images by cameras of the vehicle;

performing object detection on the images, the object detection comprising generating bounding boxes of detected vehicles near the vehicle;

selecting, as a nearest bounding box, one of the bounding boxes determined to be nearest to the vehicle;

determining a candidate parking area by extending two opposing sides of the nearest bounding box in a first direction of the bounding box or in a second direction of the bounding box, the extended portions of the opposing sides defining two sides of the candidate parking area;

based on the images, determining that the candidate parking area is not occupied;

based on the images, determining that the vehicle is able to be parked into the parking area; and based on the determining that the candidate parking area is not occupied and that the vehicle is able to be parked into the parking area, autonomously parking the vehicle into the candidate area.

19. The method of claim 18, further comprising determining whether to extend the nearest bounding box in the first direction or in the second direction based on an angle determined according to a coordinate system of the vehicle and the nearest bounding box.

20. The method of claim 19, wherein the determining that the candidate area is able to be parked in by the vehicle is based on a size of the vehicle and the candidate area.

* * * * *